UNITED STATES PATENT OFFICE.

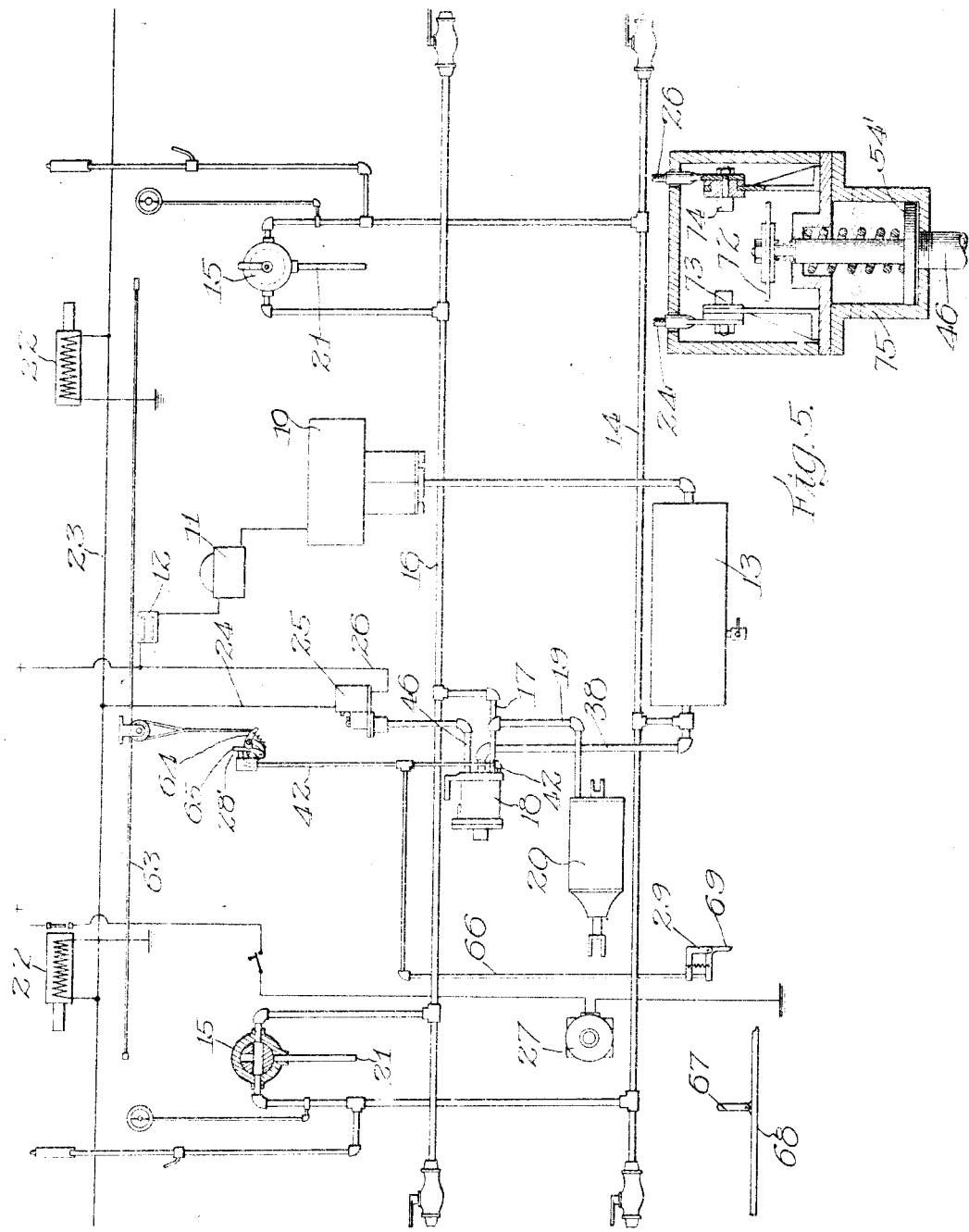

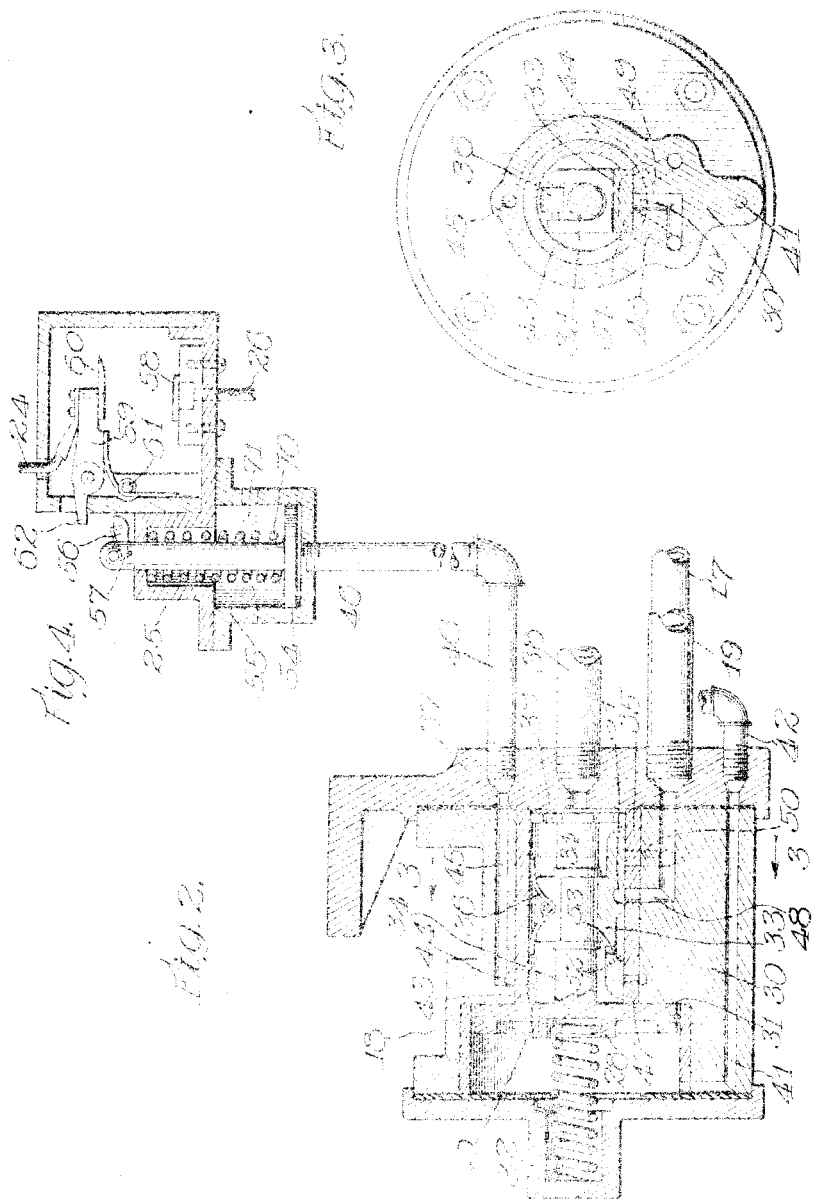

HENRY CORDELL AND JOHN G. TAWSE, OF CHICAGO, ILLINOIS.

EMERGENCY-VALVE AND CIRCUIT-BREAKER TRIP.

1,120,031. Specification of Letters Patent. Patented Dec. 8, 1914.

Application filed March 8, 1911. Serial No. 613,139.

*To all whom it may concern:*

Be it known that we, HENRY CORDELL and JOHN G. TAWSE, citizens of the United States, residing at Chicago, in the county of Cook and State of Illinois, have invented certain new and useful Improvements in Emergency - Valves and Circuit - Breaker Trips, of which the following is a specification.

This invention relates to automatic and straight air brake systems, such as are applied to motor and trailer cars of the electric railway type, either singly or in multiple trains, and the principal object of the invention is to provide a system of the character described to cause the brakes of a straight and automatic air brake system to be applied, and at the same time to open the circuits which supply current to the motors.

A further object is to provide increased flexibility of control for electric motor cars.

A further object is to provide means to apply the brakes and to cut off the supply of current to the motor in an emergency at substantially the same time.

A further object is to provide means without the control of the motorman to apply the brakes and to prevent the motorman from continuing to direct the current to the motor.

A still further object is to provide means to automatically operate the brakes by direct air pressure from the air pressure reservoir.

For the attainment of these ends and the accomplishment of other new and useful objects as will appear, the invention consists in the features of novelty in the construction, combination and arrangement of the several parts generally shown in the accompanying drawings and described in the specification, but more particularly pointed out in the claims.

In the accompanying drawings—Figure 1 shows a diagrammatic arrangement of our invention as employed in connection with a straight air brake system as applied to an electric car. Fig. 2 is a detail view in cross section of the emergency valve in the above exemplification. Fig. 3 is a cross sectional view on the line 3—3 of Fig. 2. Fig. 4 is a detail cross sectional view of a pneumatic contact maker employed in the above exemplification. Fig. 5 is a modification of a pneumatic device similar to that shown by Fig. 4.

In ordinary brake systems, such as are applied to electric cars, it is customary for a motorman located in a suitable place in the car, to exercise control over the motors and over the air brake system. The air brakes and the motors are controlled by separate controlling systems, and to apply the brakes and stop the motors in an emergency, it is necessary to operate both controlling systems. There sometimes arises an occasion where it is necessary for some one other than the motorman to stop the car suddenly. Heretofore, this has been accomplished by the conductor signaling the motorman of his desire to stop, thereby resulting in a loss of time, which in an emergency might be fatal. This invention contemplates the provision of means whereby the conductor or any person other than the motorman may operate a device which shall effect the application of the brakes and also cut off the current to the motor without the intervention of or signaling to the motorman.

Referring now more particularly to Fig. 1 of the accompanying drawings, this system is shown as applied to a straight air brake system of a well known type, and in which there is diagrammatically shown an air compressor 10 with its governor 11 and fuse 12, which is adapted to supply air to the air reservoir 13. This latter has connection with the reservoir line 14, which is connected to the motorman's valve 15. This valve 15 is adapted to provide communication from the reservoir line 14 to a train line 16. The train line 16 has communication by means of the pipes 17 through the emergency valve 18 and pipes 19 to the brake cylinder 20. The motorman's valve 15 may be of any suitable construction, a three way valve being shown in the present exemplification, and an exhaust pipe 21 being provided to release the air pressure applied to the brake cylinder 20. Circuit breakers 22 are shown with their coils connected at one end to the ground, and at the other end to a common conductor 23, which, in case the system is applied to more than one car, runs throughout the entire train. This conductor 23 is connected by conductor 24 to the circuit breaker trip 25, which is also connected by means of the conductor 26 to the positive source of current supply. The circuit breakers are operative to control circuits from the positive source of supply to and through the motors, as for example, motor 27 and thence to the ground. To operate the emergency device 18, there is shown a manually operated device 28', and an automatically operated device 29, both of which will be hereinafter more particularly described.

The emergency valve 18 is shown in detail sectional elevation by Fig. 2. This comprises a cylindrical member 30 formed with a shoulder 31 and a piston 28 is adapted to be moved in the said cylinder and to be held normally against the shoulder 31 by a spring 32. In the smaller cylindrical portion of the member 30, a valve member 33 suitably connected to a projection 34 from the piston 28 is movable with the said piston upon a valve seat member 35. This valve member 33 is suitably pressed upon the valve seat member 35 by a spring 36 which engages the opposite side of the reduced portion of the cylinder. At the end of the reduced portion of the cylinder opposite the shoulder 31 there is a plate 37 which is provided with a number of perforations and pipes threaded therein. The reduced portion of the cylindrical member is connected directly to the main air reservoir 13 by means of the pipe or tube 38, and as the end of the projection 34 is provided only with guides 39 in the reduced portion of the cylinder, the full pressure of the air reservoir may be exerted upon the piston 28. Through the piston 28, however, there is a small opening 40, which is adapted to equalize the pressure upon opposite sides of the piston, so that in normal position the piston is held against the shoulder by the spring 32, there being an equality of air pressure upon both sides of the said piston. Communicating with the enlarged end of the cylinder there is an air passage 41 which is connected by means of the tube 42 to an atmospheric outlet. It is evident that when this outlet is opened to the atmosphere, the pressure upon the enlarged end of the cylinder will be reduced to that of the atmosphere, and the piston will be caused to move in the cylinder by reason of the pressure of the main air reservoir 13, the opening 40 not being large enough to permit the free passage of the air from one side to the other. In the small cylindrical opening there is positioned a shell 43, and the valve seat member 35 is preferably formed on or in the said shell member 43. Surrounding the shell is an annular opening 44 which communicates with an opening 45 which has communication with the pneumatic device 25 by means of the pipes or tubes 46. Through this shell shaped member and adjacent the portion referred to as the valve seat member is an opening 47 which communicates with the annular opening 44 and which is covered during the normal position of the piston by a projecting portion of the valve member 33. Openings or passages 48 and 49 are also provided in the valve seat member 35 which are provided respectively with the conducting tubes 19 and 17. Communicating also with the tube 19 is a passage or opening 50 which is normally covered by the valve member 33. In this valve member 33 is a connecting passage 51 which is adapted in the normal position of the valve member to afford communication between the openings 48 and 49, thus providing an unobstructed passageway through this emergency device for the normal operation of the brake cylinder, for it is seen that the tubes 17 and 19 are connected respectively to the train line 16 and to the brake cylinder 20. An elongated slot or opening 52 is also provided in the lower surface of the valve member 33 with an opening 53 communicating with the interior of the cylinder, and it is evident that when the valve member 33 is moved in the cylinder by the pressure of the air, the opening 47 has direct communication with the opening 53 and the slotted portion 52, thereby affording a direct passage of air from the air reservoir to the pneumatic contacting device 25. It is also seen that as soon as the valve member 33 is moved, the passageway 51 which connects the openings 48 and 49 is also moved, closing the connection between these two openings and exposing the opening 50 to the direct pressure of the air in the cylinder. Thus it will be seen that communication between the brake cylinder and the train line is cut off and a passageway is opened directly from the air reservoir through the emergency device to the brake cylinder. Substantially at the same time that the brake cylinder is operated, the pneumatic device 25 receives the direct air pressure from the air reservoir, and a loose fitting piston 54 is pressed upwardly in the cylinder 55 of this pneumatic device. Suitably located on the rod projecting upwardly from the piston 54 is an engaging dog or pawl 56, which is pressed by the spring 57 to take the position shown in Fig. 4. An insulated contact member 58 is mounted adjacent the said pneumatic device and a pivoted member 59 which carries an insulated contact member 60 is suitably pivoted and is pressed out of engagement with the contact 58 by means of the spring 61. The pivoted member 59 is provided with a projection 62 which the dog 56 is adapted to engage in its upward movement. As soon as the pivoted member 59 is thus engaged, the contacts 58, 60, are joined to complete the electric circuit from the conductors 26 to 24, (see Fig. 1), thereby energizing the circuit breaker coils and causing the circuit breakers to be operated. In returning to normal position, the dog 56 is allowed by its resilient connection to pass the projection 62 of the pivoted member 59, the latter being caused to take its normal position by means of the spring 61.

It is evident that whenever the pressure on one side of the piston in the emergency device is reduced to such an extent as to enable the air pressure to overcome the pressure of the spring 32, the motorman's control of the air brake cylinder will be cut off, the brake cylinder will be subjected to the direct pressure of the air reservoir, and the circuit breakers will be energized. While it is contemplated that various means may be employed to effect the reduction in pressure upon this side of the cylinder referred to, suitable and efficient means both for manually and automatically effecting this reduction will now be described.

A bell cord 63 is commonly provided in the cars to which this system is applied with connection to a lever 64 which is adapted to maintain a member 65 in position against the end of the atmospheric tube 42 in such a manner as to prevent the escape of air therefrom. When this bell cord 63 is pulled, the member 65 is released and the pressure on one side of the piston 28 is allowed to escape to the atmosphere. As a means for automatically opening a connection to the atmosphere, a tube 66 is provided in connection with the atmospheric tube 42, having its end provided with the opening device 29 in proximity to the side or bottom of the car in position to be engaged by an obstruction or stop 67 secured to the ground or a standard 68. This device 29 may be similar to the device 28' above described, and is so disposed that when the stop 67 engages a projecting arm 29, the tube 66 will be opened to the atmosphere. These devices 28' and 29 are preferably so constructed that as soon as they are released, they will be returned immediately to the normal or closing position, or may be closed manually.

In restoring this system to its normal position, it is necessary only to close the connection, which causes the enlarged end of the cylinder to communicate with the atmosphere. This will cause the air pressure upon this side of the piston to be restored or equalized with that on the other side of the piston by means of the opening through the piston, the pressure of the spring 32 being sufficient to restore the equalized piston to its normal position. As soon as the valve member 33 is pressed past the opening 47, the air tube 46 will be cut off from connection with the air reservoir and the piston 54 of the pneumatic device 25 will be allowed to fall by its own weight or by reason of a spring 70, and to retain its original or normal position. This device may also be provided with openings 71 which will cause the pressure applied to this piston 54 to be reduced. In the restored position of the valve member 33, the passage 51 again affords communication between the passages 48 and 49, and places the control of the brakes again within the command of the motorman.

A modification of the contacting device is shown in Fig. 5, in which a spring pressed piston 54' carries the contact member 72, which is adapted to make electrical connection between the contact members 73 and 74 in a well known manner. This device is also preferably provided with a series of openings 75, which will allow the piston to return to its normal position as soon as the passageway or communicating tube 46 is closed at the other end.

The pneumatic device 25 may be connected to the atmospheric outlet tube 42 and a trip cock such as device 28' may be positioned between the emergency valve 18 and the device 25, so that the exhaust from the emergency valve 18 will be directed against the piston 54 and the contact members 58 and 60 will be joined at the same time the piston 28 in the emergency device 18 is moved, thereby causing the supply circuit to the motors to be cut off at substantially the same time the brakes are applied.

It is evident that with this improved system, the control of a car or a train in an emergency is placed without the control of the motorman, and an advantage of this system consists in the fact that in such emergency the supply of current to the motor is cut off and the brakes are applied to stop the car or train in a minimum distance. With this system it is not possible for the motorman to supply the motor with current after the brakes are applied by some one else, for when he is able to still energize the motors when the brakes are applied, it is evident that the motors or motor fuse may be easily burned out, due to the overload on the motor.

It is evident that this system may be applied to a single car or a train of cars, and that in the latter application the operation of an emergency device in any car will effect the application of the brakes and the cut-off of the motors for the whole train.

Although we have thus specifically described the preferred embodiment of our invention, it is evident that those skilled in the arts to which this appertains may make various changes in the construction, combination and arrangement of the several parts without departing from the spirit and scope of our invention.

What we claim is:

1. The combination with a straight air brake system for electric motor cars, of means to control the air brakes and the motors from a given place in the car, emergency air pressure devices, a circuit breaker to control the circuit of the motor, one of the said devices being effective when operated to energize the circuit breaker, and another of said pressure devices being effective when operated to set the brake and to operate the other said device, and means to operate the last named device.

2. In an air brake system for electric motor cars, the combination with means to control the brakes and the motor from a given place in the car, of circuit breakers to control the circuits of the motors, emergency air pressure devices, one operative to close a crcuit to energize the circuit breaker and thereby to open the motor supply circuit, and another device operated by manual means without the control of the said controlling means effective to apply the brakes automatically and at the same time automatically to actuate the other said device.

3. The combination with a straight air brake system for electric cars having means normally to control the motor and brakes from a given station in the car, of emergency means comprising a circuit breaker for the motor circuit, a pneumatically operated circuit closing device for the circuit breaker coils, and an emergency air pressure device having a direct connection with the air pressure reservoir, a passage through the device to permit the free passage of air to and from the brake cylinder from the operator's valve, means to actuate the emergency device, and means to open air passages to the circuit closing device and to the brake cylinder when the said emergency device is actuated.

4. The combination with a straight air brake system for electric cars having means normally to control the motor and brakes from a given station in the car, of a magnetic circuit breaker for the motor circuit, a pneumatically operated circuit closing device for the circuit breaker winding comprising a piston, a spring pressed contact member, means in connection with the piston to engage the said contact member when pressure is applied to the piston thereby to close an electrical connection to the circuit breaker coils, and an emergency air pressure device operative to apply the brakes and to admit pressure to the said circuit closing device, the latter being operative through the circuit breaker to open all power connections to the motors.

5. In an emergency straight air brake system for electric cars, the combination with means normally to control the operation of the motors and the brakes from a given station in the car, of electro-responsive means to control the power circuit of the motors, a pneumatic device operable to close an energizing circuit to the said electro-responsive means, and an emergency device having a passage through it to permit the normal operation of the brakes, means for an air pipe connection with the said pneumatic device, a movable piston, a valve member connected therewith, means to cause the piston to move and by said movement to cause the valve member to close the said passage and to open the brake cylinder to the direct pressure of the air reservoir, and to subject the said pneumatic device to the same pressure whereby the energizing circuit is closed to the circuit breaker causing the power circuit of the motors to be opened, the emergency device being restored to normal condition by replacing the last named means and the pneumatic device being provided with a piston which permits the slow passage of air by it in the cylinder and a spring-pressed dog which engages in one direction of motion.

6. In an automatic air brake system for electric cars and trains, an automatic air pressure device having a piston and a contacting device, circuit breakers to control the supply of current to the motors and having a common conductor throughout the train, and means to reduce the train line air pressure and to effect thereby the movement of said piston to operate the air pressure device, the contacting device being thereupon operative to effect the closing of a circuit connection to the common conductor whereby all of the circuit breakers are energized.

7. The combination in an automatic air brake system for electric cars and trains, of a motorman's controlling valve, emergency valves, circuit breakers to control the circuit connections to the motors, said valves having connection with the train line and the air reservoir line, of an exhaust air passage for the conductor's valve, an air pressure circuit closing device having a piston movable in an apertured cylinder and operative to close the circuit closing device, the circuit closing device being operative to complete a circuit through the circuit breaker coils, the said device being connected to the exhaust air passage, and means without the control of the motorman to direct the exhaust air against the said piston when the conductor's valve is operated, the circuit breaker being energized and the brakes applied through the conductor's valve at or about the same time.

In testimony whereof we have signed our names to this specification, in the presence of two subscribing witnesses, on this 4th day of March A. D. 1911.

HENRY CORDELL.
JOHN G. TAWSE.

Witnesses:
NINA J. HALSNE,
K. W. WONNELL.